United States Patent
Gardner

(10) Patent No.: US 6,385,616 B1
(45) Date of Patent: May 7, 2002

(54) TIME-VERSIONED DATA STORAGE MECHANISM

(75) Inventor: Paul Anton Richardson Gardner, Burnham (GB)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/354,035

(22) Filed: Jul. 15, 1999

(30) Foreign Application Priority Data

Aug. 29, 1998 (GB) .............................................. 9818819

(51) Int. Cl.$^7$ .............................................. G06F 17/30
(52) U.S. Cl. ................................ 707/10; 707/1; 707/2; 707/203; 714/12; 714/15; 714/19; 714/20; 714/21
(58) Field of Search ................................. 707/203, 1–2, 707/10; 714/12, 15, 19–21

(56) References Cited

U.S. PATENT DOCUMENTS 5,412,801 A * 5/1995 de Remer et al. .......... 395/575
5,513,112 A * 4/1996 Herring et al. ........ 364/464.02
5,592,661 A * 1/1997 Eisenberg ................... 395/600

* cited by examiner

Primary Examiner—Hosain T. Alam
Assistant Examiner—Cam Y Truong
(74) Attorney, Agent, or Firm—Lee, Mann, Smith, McWilliams, Sweeney & Ohlson

(57) ABSTRACT

In a time-versioned storage mechanism, data is stored as a plurality of records, each including at least one attribute, a time span indicating the time span for which the attribute is valid, an insertion time indicating when the record was created, and a type field. The type field indicates whether the record is a concrete record, a delta record that possibly modifies the attribute value of a previous concrete or delta record, or an archive record replacing one or more records that have been archived. The data is accessed to find an attribute value from the point of view of a specified viewpoint time, by retrieving only records with insertion times not later than said viewpoint time, and constructing an attribute value from the retrieved records. The data is updated only by adding concrete records or delta records, without modifying attribute values in the concrete records or delta records.

8 Claims, 5 Drawing Sheets

FIG. 3A
Existing data - Critical point = 06/06/1996

| Attribute | StartTime | EndTime | InsertTime | Type |
|---|---|---|---|---|
| X | 05/06/1996 | top | 01/01/1997 | concrete |

FIG. 3B
Update Y, [04/04/1994, 05/05/1995] - Before critical point

| Attribute | StartTime | EndTime | InsertTime | Type |
|---|---|---|---|---|
| X | 05/06/1996 | top | 01/01/1997 | concrete |
| Y | 04/04/1994 | 05/05/1995 | 01/01/1998 | delta |

FIG. 3C
Update Y, [07/07/1997, top] - After critical point, to top

| Attribute | StartTime | EndTime | InsertTime | Type |
|---|---|---|---|---|
| X | 05/06/1996 | 06/07/1997 | 01/01/1997 | concrete |
| Y | 06/07/1997 | top | 01/01/1998 | concrete |

FIG. 3D
Update Y, [07/07/1997, 08/08/1998] - After critical point, not to top

| Attribute | StartTime | EndTime | InsertTime | Type |
|---|---|---|---|---|
| X | 05/06/1996 | 06/07/1997 | 01/01/1997 | concrete |
| Y | 06/07/1997 | 08/08/1998 | 01/01/1998 | concrete |
| X | 08/08/1998 | top | 01/01/1998 | concrete |

FIG. 3E
Update Y, [05/05/1995, top] - Spanning critical point, to top

| Attribute | StartTime | EndTime | InsertTime | Type |
|---|---|---|---|---|
| X | 05/06/1996 | 06/06/1996 | 01/01/1997 | concrete |
| Y | 06/06/1996 | top | 01/01/1998 | concrete |
| Y | 05/05/1995 | 06/06/1996 | 01/01/1998 | delta |

FIG. 3F
Update Y,[05/05/1995, 07/07/1997] - Spanning critical point, not to top

| Attribute | StartTime | EndTime | InsertTime | Type |
|---|---|---|---|---|
| X | 05/06/1996 | 07/07/1997 | 01/01/1997 | concrete |
| X | 07/07/1997 | top | 01/01/1998 | concrete |
| Y | 05/05/1995 | 07/07/1997 | 01/01/1998 | delta |

TIME-VERSIONED DATA STORAGE MECHANISM

BACKGROUND TO THE INVENTION

This invention relates to a time-versioned data storage mechanism.

In conventional data storage mechanisms (such as relational databases for example), queries to the data storage mechanism will return results that reflect the current state of the data, at the date on which it. was last updated. Also, existing versioning systems are based on the premise that changes are always made to the current state and that changes in the past or future are not supported.

However, it would be desirable to be able to view the state of the data from any selected point in time. It would also be desirable to be able to make changes to the past or future states of the system, not just to the current state. However, conventional data storage mechanisms do not have these capabilities.

The object of the present invention is to provide a novel data storage mechanism that supports the ability to view the state of the data from any selected point in time.

SUMMARY OF THE INVENTION

According to the invention data processing apparatus comprises means for storing a plurality of records, each record including:
(a) at least one attribute;
(b) a time span indicating the time span for which the attribute is valid;
(c) an insertion time indicating when the record was created; and
(d) a type field, indicating whether the record is a concrete record, or a delta record that possibly modifies the attribute value of a previous concrete or delta record.

BRIEF DESCRIPTION OF THE DRAWINGS

FIG. 3 shows examples of the operation of the database update function.

DESCRIPTION OF AN EMBODIMENT OF THE INVENTION

One data processing apparatus including a time-versioned data storage mechanism in accordance with the invention will now be described by way of example with reference to the accompanying drawings.

The data storage mechanism supports a time-versioned view of the objects. Central to this is the ability to view the state of objects from any particular point in time, supporting queries such as "what would be the result of an evaluation have been if performed in 1960?" There are two main concepts:
1) View point time, $T_V$. This is the point in time from which the state is being viewed.
2) Target time span, $[T_S, T_E]$. This is the time span over which the data is required.

For example, if $[T_S, T_E]$ and $T_V$ were all "Jan. 1, 1960", this would represent the state of the system exactly as of 1960. If $T_V$ was Jan. 1, 1995 and $[T_S, T_E]$ were both Jan. 1, 1960 then this would represent the state of the system as of 1960 but including any changes that had been made to the 1960 state up until 1995 (e.g. to fix errors in the 1960 state). Note that it can also be sensible to discuss future object state, for example where one has been informed of the fact that "from Jan. 1, 1999 X will be living at Y".

To support the above behaviour it is necessary to ensure that all modifications to object state are associated with the time that they were made and with the time they apply for, and that no information is ever lost in the modification process.

Also of practical concern is the cost of the approach, both in terms of storage required to maintain time-versioned state (both on-line and archived) and the process costs involved in building a particular view of an object's state from the stored data. The following discussion assumes that:
1) The normal pattern of use of object state will be "the current state" as opposed to state in the past or future. The current state will normally exist "from now onwards", as opposed to "from now until X".
2) The normal pattern of update will be changes to the current state as opposed to changes to the past or future state. Changes will normally apply "from now onwards", as opposed to "from now until X".
3) That an archiving approach will be required for data older than a certain age.

Overview of the System

Figure 1:
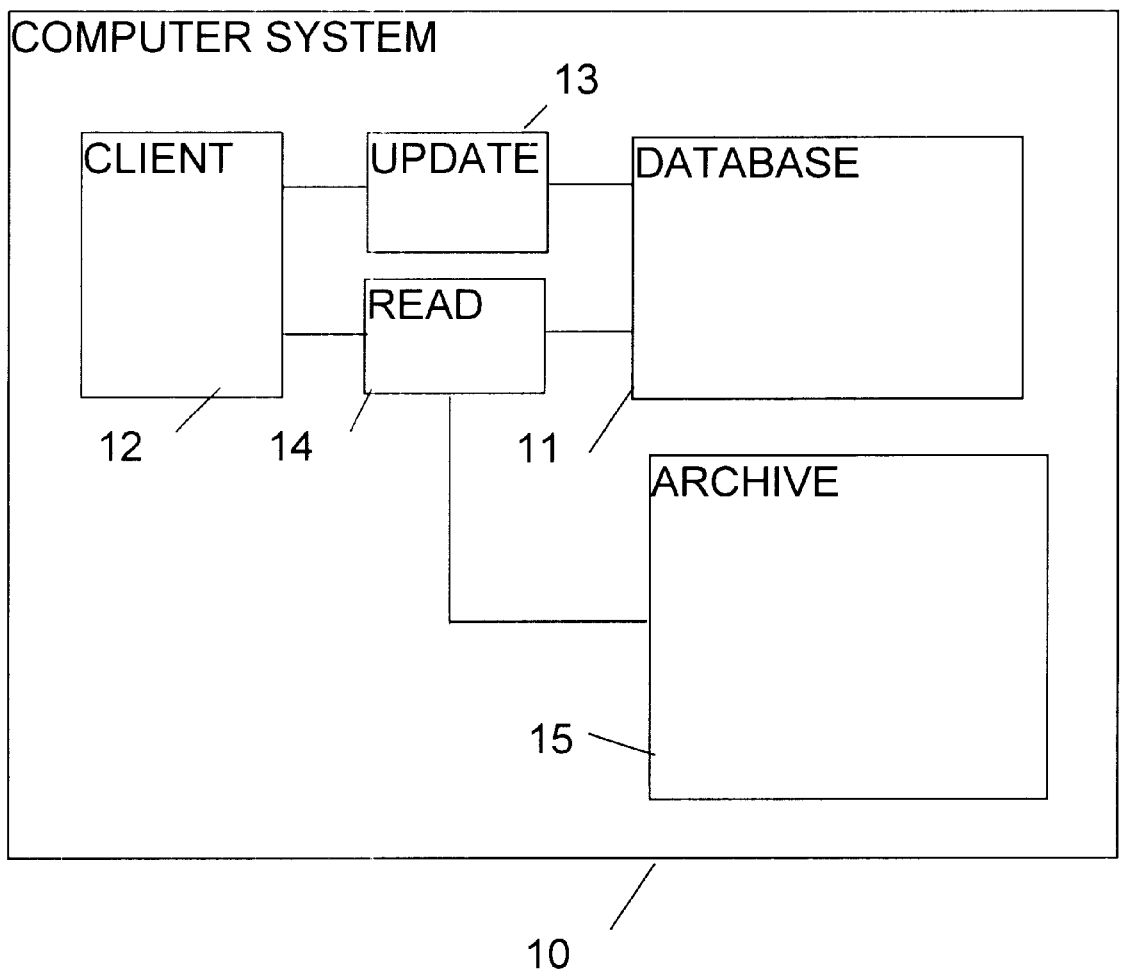
FIG. 1 is a block diagram of a data processing apparatus embodying the invention.

Referring to FIG. 1, the apparatus comprises a computer system 10, which includes a database 11, and a client application 12 which accesses the data in the database. The client accesses the database by way of an update function 13, and a read function 14. The apparatus also includes an archive store 15.

Database

The database comprises a large number of records (or rows), each of which comprises the following fields (or columns):

UniqueID: This identifies the object to which the record relates. For example, it may identify a particular person, such as a customer or employee.

Attributes: One or more attributes of the object to which the record relates. For example, a record may contain attributes representing a person's name, salary, date of birth, and so on. It may also contain special values representing "none" (indicating that it is known no value exists) and "unknown" (indicating that it is not known whether or not a value exists).

StartTime: The start of the time span for which the data in this record is defined.

EndTime: The end of the time span for which the data in this record is defined.

InsertTime: The date on which this record was created.

Type: The record type. This may have one of three values: "concrete", "delta", and "archive".

In the present example, StartTime, EndTime, and InsertTime are defined in a simple date format (dd/mm/yyyy). Special date values "top" and "bottom" are reserved to denote hypothetical maximum and minimum dates.

A "concrete" record is a record that denotes the attribute values of the object over the specified time span. The StartTime value in the concrete record is non-inclusive: that is, it is one day before the real start of the time span. The EndTime field, on the other hand, is inclusive: it is equal to the actual end of the time span. The effect of this is that, for adjacent concrete records, the EndTime of one record is equal to the StartTime of the next.

A "delta" record is a record that captures a (non-proper) subset of attribute values, normally with respect to an existing concrete record and potentially other delta records. Field entries for unaffected attributes have the value "unused". Unlike the "concrete" records, the StartTime for a "delta" record is inclusive.

An "archive" record indicates that any values with insertion time up to and including a specified archive point time TA have been archived. If access to these values is required the archive store will need to be consulted.

For clarity, the UniqueID fields have been omitted in the following discussion and figures, and it has been assumed that each object contains just a single attribute value.

Updating the Database

In the following discussion of the update function the start times of all concrete records referred to are the actual start times, not the recorded start times (which are one less than the actual). This is to aid understanding; the logical algorithm is unaffected.

Figure 2:
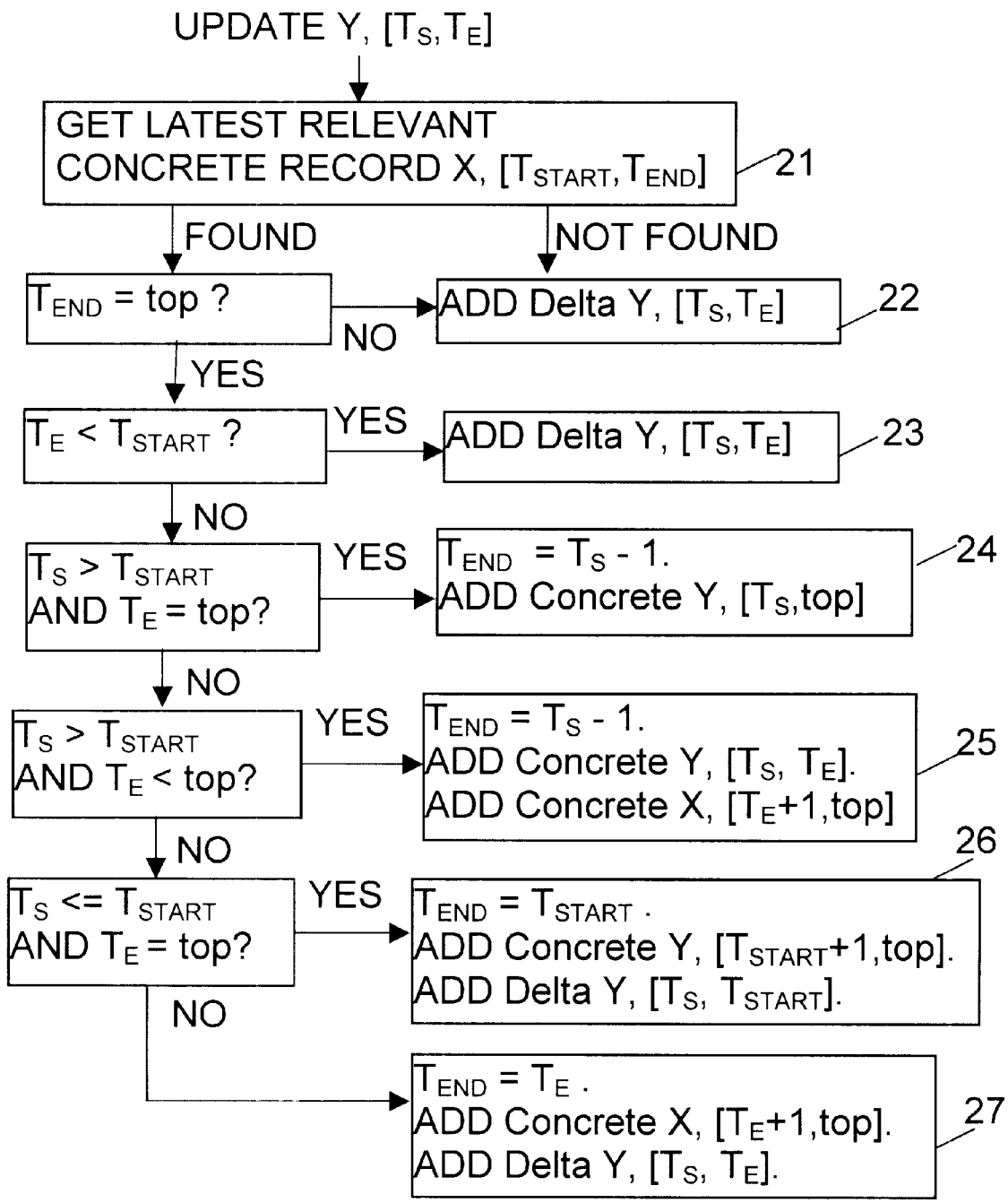
FIG. 2 is a flow chart showing a database update function.

The database update function is shown in FIG. 2. It is assumed that it is required to update a particular attribute with a new value Y for the target time span $[T_S, T_E]$.

(Step 21) The update function first uses the database read function described below (Steps 41, 42, 44 and 45 only), over time span $[T_S, T_E]$, with $T_V$ set to "current time". This will return zero or more concrete records. The interesting value is the latest concrete record $C_I$, which is assumed to have attribute value X and time span $[T_{START}, T_{END}]$. If no such existing concrete record is found, this implies that the update is being applied to a time prior to the creation of the attribute.

(Step 22) If no existing concrete record was found, or if the time span of this existing record does not run to "top", the update is performed by creating a single delta record having attribute value Y and time span $[T_S, T_E]$. Otherwise, the situation is more complex, depending on the relation between the target time span $[T_S, T_E]$ and the critical point $T_{START}$, as will now be described.

The following description will be illustrated with reference to FIGS. 3A to 3F. Note that in these figures the values stored for concrete record start times are one less than the actual start times.

FIG. 3A shows an existing concrete record, having value X, and time span [Jun. 6, 1996, top]. (It will be recalled that the StartTime of a concrete record is non-inclusive and so the real start of the time span for each concrete record is actually one day after the StartTime value in that concrete record). The critical point $T_{START}$ is therefore Jun. 6, 1996 in this example. FIGS. 3B to 3F show the result of updating this existing record with a new value Y for various target time spans $[T_S, T_E]$.

(Step 23) If the target time span $[T_S, T_E]$ lies wholly before the critical point $T_{START}$, the update is performed by creating a single delta record having attribute value Y and time span $[T_S, T_E]$. For example, FIG. 3B shows the case where the target time span is [Apr. 4, 1994, May 5, 1995].

(Step 24) If the target time span $[T_S, T_E]$ lies after the critical point $T_{START}$, and extends to "top", the update is performed by creating a single concrete record having attribute value Y and time span $[T_S, \text{top}]$. The EndTime value of the existing concrete record is changed to $T_S-1$. For example, FIG. 3C shows the case where the target time span is [Jul. 7, 1997, top].

(Step 25) If the target time span $[T_S, T_E]$ lies after the critical point $T_{START}$, but does not extend to "top", the update is performed by creating a first concrete record having attribute value Y and time span $[T_S, T_E]$, and a second concrete record having attribute value X and time span $[T_E+1, \text{top}]$. The EndTime value of the existing concrete record is changed to $T_S-1$. For example, FIG. 3D shows the case where the target time span is [Jul. 7, 1997, Aug. 8, 1998].

(Step 26) If the target time span $[T_S, T_E]$ starts at or before the critical point TSTART, and extends to "top", the update is performed by creating a concrete record having attribute value Y and time span $[T_{START}+1, \text{top}]$, and a delta record having attribute value Y and time span $[T_S, T_{START}]$. The EndTime value of the existing concrete record is changed to $T_{START}$. For example, FIG. 3E shows the case where the target time span is [May 5, 1995, top].

(Step 27) Otherwise, the target time span $[T_S, T_E]$ spans the critical point $T_{START}$, but does not extend to "top". In this case, the update is performed by creating a concrete record having attribute value X and time span $[T_E+1, \text{top}]$, and a delta record having attribute value Y and time span $[T_S, T_E]$. The EndTime value of the existing concrete record is changed to $T_E$. For example, FIG. 3F shows the case where the target time span is [May 5, 1995, Jul. 7, 1997].

Note that in all cases where an existing record is updated, the update is restricted to changing the EndTime value of that record. This only ever happens to concrete records, and when it does it is always a change from "top" to a lower value $T_X$. Note also that a new concrete record is always created over the time span $[T_X+1, \text{top}]$.

A value can be deleted by updating the record as described, inserting the special "none" value in the appropriate field.

It can be seen that, with this update process, information is never lost during an update to the database. New data is recorded in such a way that it is possible to deduce that the new data supersedes the old data.

Creation

The creation of an attribute with value Y for the target time span $[T_S, T_E]$ is equivalent to an update of a hypothetical concrete record, "unknown" [bottom-1, top], in place of $X[T_{START}, T_{END}]$ (i.e. $C_I$) in the description of the update function above. This results in execution of either step 24 or 25, which produces either one or two concrete records. The change to $T_{END}$ of the hypothetical record is ignored.

Accessing the Database

Figure 4:
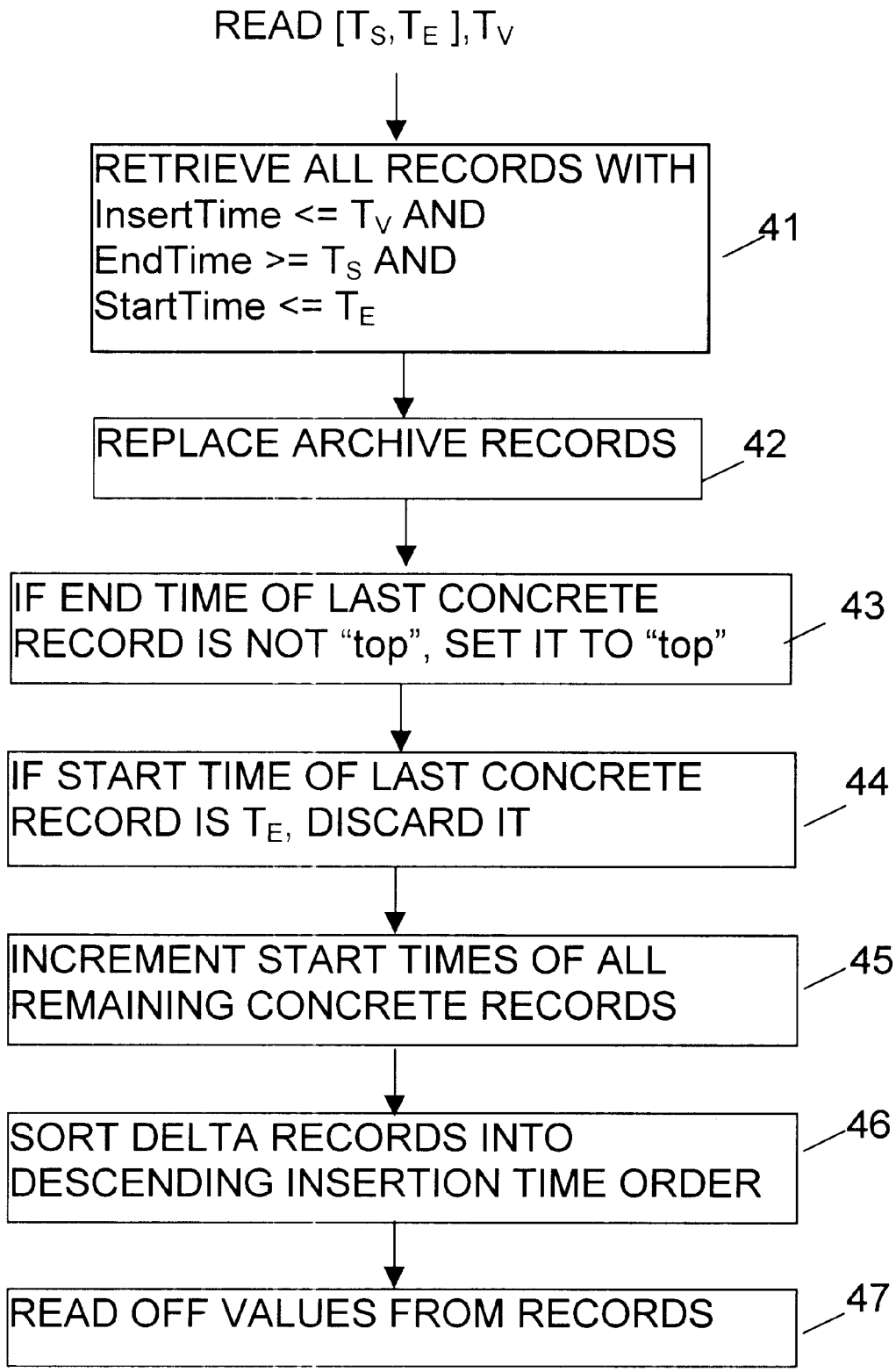
FIG. 4 is a flow chart showing a database read function.

FIG. 4 shows the database read function. This finds the value of an attribute for a specified time span $[T_S, T_E]$ from the point of view of time $T_V$.

(Step 41) The read function accesses the database to retrieve all records that satisfy the following condition:

InsertTime<=$T_V$ and

EndTime>=$T_S$ and

StartTime<=$T_E$.

This will return zero or more concrete or archive records, and zero or more delta records. The retrieved records are then processed as follows. (It will be appreciated that the processing described below with reference to Steps 42–47 is performed on retrieved copies of the records; the original stored records are not changed).

(Step 42) If an archive record is found, the archive store 15 is consulted, and the record is replaced with the corresponding records from the archive store. This process is repeated recursively until there are no more archive records that need unpacking. (Step 43 If the end time $T_E$ of the last concrete record is not "top", it is now set to "top". (The update that changed this record's end time to be other than "top" must have occurred later than $T_V$ and so does not need to be considered).

(Step 44) If the start time of the last concrete record is equal to $T_E$, this record is discarded.

(Step 45) The start times of all remaining concrete records are incremented by 1 to give an inclusive start time.

(Step 46) Any delta records retrieved are sorted into descending insertion time order.

(Step 47) The records are then processed by scanning the time range in increasing time order and, for each point in time, taking the record with the latest InsertTime and reading off its value.

This process can be visualised as stacking the delta records on top of the underlying contiguous concrete records, and then reading the values off by looking down at the values from above and taking the first value encountered. (Note there are never any concrete records with insertion times later than or equal to those of the delta records over the same period). If there are time periods for which neither a concrete nor a delta record applies, the value for this period is "unknown".

Figure 5:
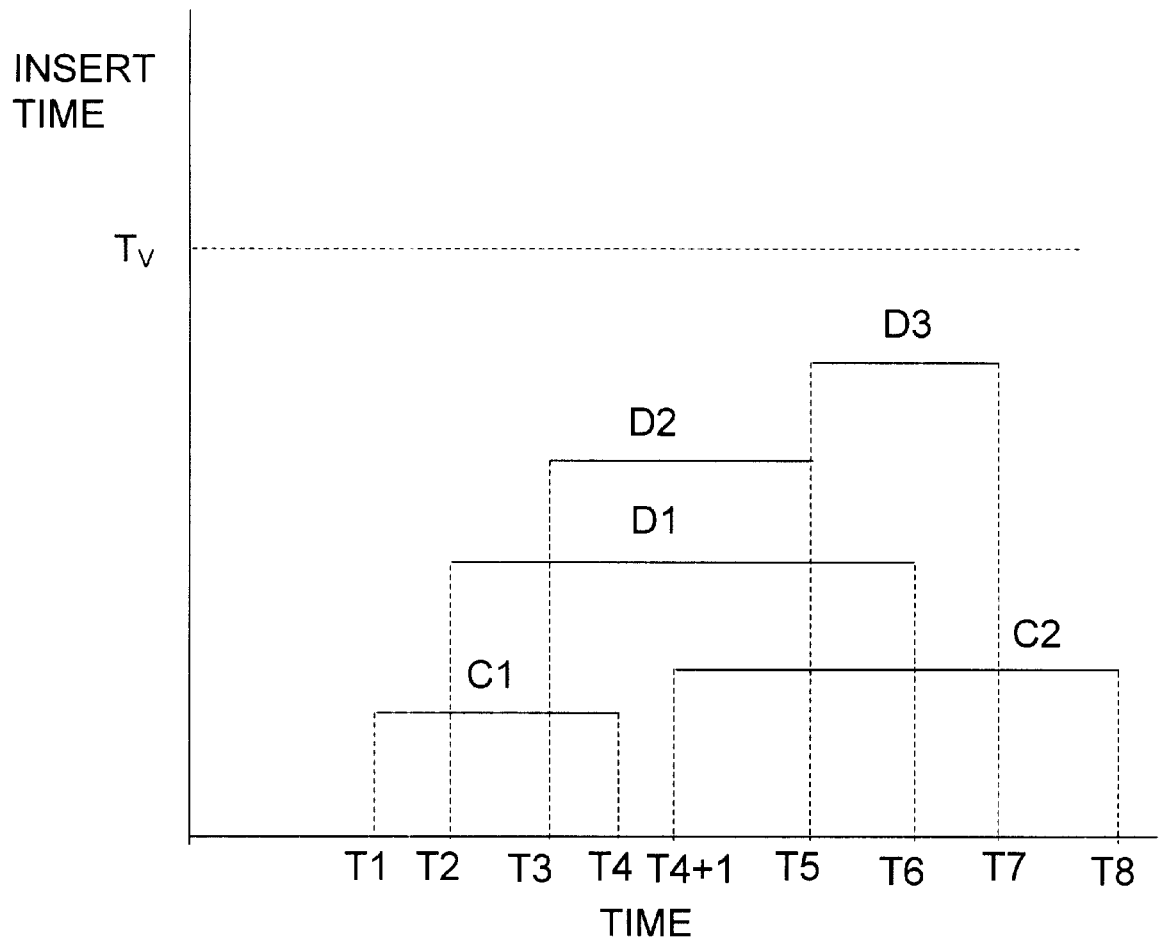
FIG. 5 is a diagram illustrating the operation of the database read function.

For example, FIG. 5 shows a sequence of concrete records C1, C2, and delta records D1, D2, D3. Time spans are represented along the horizontal axis, and insertion times along the vertical axis. It can be seen that, in this example, the read function returns the following sequence of values:

C1 [t1, t2−1]
D1 [t2, t3−1]
D2 [t3, t5−1]
D3 [t5, t7]
C2 [t7+1, t8]

Archiving

Archiving permits old parts of object state to be stored in near-line or offline storage to minimise the storage requirements of the main object store.

Archiving is implemented by means of an archiving process, which is run periodically. The archiving process scans all the database, to find records with an insertion time and end time earlier than or equal to a specified archive point time $T_A$. Each of these records is written into the archive store 15, and they are replaced by a single archive record in the database 11.

The archive record contains the following fields:
InsertTime="bottom"
StartTime="bottom"
EndTime=$T_A$
Attribute=an archive reference that points to the location of the archived records in the archive store.

This process can be applied repeatedly with archive records themselves being archived.

It should be noted that the archiving process does not remove delta records that may apply to the archive period but were written after the archive point.

Some Possible Modifications

It will be appreciated that many modifications may be made to the system described above without departing from the scope of the present invention.

For example, when reading data the values can be returned incrementally over time, starting with the most recent values. The most significant advantage with this approach is that the unpacking of archive data can be delayed until absolutely necessary. If the client of the data decides that only a subset of $[T_S, T_E]$ is required then this can result in significant savings.

The approach taken with concrete records, where their recorded start time is one less than the real start time, can be changed to use the real start time. The impact of this would be that when reading records one extra unit of time would have to be considered, with the potential of also finding unwanted delta records as well as the extra concrete record. (This could be avoided by extending the query logic but the added cost of this would be incurred in all reads).

Concrete records could be done away with altogether and pure delta records utilised. This would reduce the storage required by the system but would increase the processing cost of assembling object state and complicate archiving.

What is claimed is:

1. A data processing method comprising:
   (a) storing a database comprising plurality of records, each of said records including:
      (i) at least one attribute,
      (ii) a time span indicating the time range for which the attribute is valid,
      (iii) an insertion time indicating when the record was created; and
      (iv) a type field, indicating whether the record is a concrete record, or a delta record that possibly modifies the attribute value of a previous record; and
   (b) updating an existing record, having an existing attribute value and an existing time span, with a new attribute value and a new time span, said updating comprising comparing said new time span with said existing time span and performing one of a number of different predetermined actions according to the result of the comparison, wherein said predetermined actions comprise:
      (i) in the event that said new time span is earlier than said existing time span, adding a delta record for said new time span;
      (ii) in the event that said new time span overlaps the end of said existing time span, adding a concrete record for said new time span, and modifying the time span of the existing record to end at the start of the new time span;
      (iii) in the event that said new time span lies wholly within said existing time span, adding a first concrete record for said new time span, adding a second concrete record for the portion of the existing time span subsequent to the end of said new time span, and modifying the time span of the existing record to end at the start of the new time span;
      (iv) in the event that said new time span wholly overlaps said existing time span, adding a concrete record for the portion of the new time span subsequent to start of the existing time span, adding a delta record for the portion of the new time span preceding the existing time span, and collapsing the time span of the existing record; and
      (v) in the event that said new time span overlaps the start of said existing time span, adding a concrete record for the portion of the existing time span subsequent to the end of the new time span, adding a delta record for the new time span, and modifying the time span of the existing record to end at the end of the new time span.

2. A data processing method according to claim 1 further including
   (a) specifying a database query, said query containing:
      (i) a target time span indicating a time range over which values of said attribute are required, and
      (ii) a point-of-view time indicating the point in the time from which the values are to be viewed; and
   (b) accessing the database and outputting a sequence of values representing the evolution of said attribute over said target time span, as viewed from said point-of-view time.

3. A data processing method according to claim 2 wherein the step of accessing the database includes retrieving records whose time spans overlap said target time span and whose insertion times are not later than said point-of-view time.

4. A data processing method according to claim 3 further including, for each point in time of the target time span, selecting the attribute from the retrieved.record with the latest insertion time whose time span includes said point in time, to provide an output value for that point in time.

5. A data processing method comprising:
   (a) storing a database comprising plurality of records, each of said records including:
      (i) at least one attribute,
      (ii) a time span indicating the time range for which the attribute is valid, and
      (iii) an insertion time indicating when the record was created;
   (b) selecting records with time span and insertion time both earlier than a specified archive time, and transferring those records from the database to a location in an archive store; and
   (c) replacing the records that have been transferred to the archive store by inserting in the database a single archive record, said archive record having:
      (i) an attribute containing a pointer to said location in the archive store
      (ii) a time span extending from a lowest time value up to the specified archive time, and
      (iii) an insertion time equal to said lowest time value.

6. A data processing method according to claim 5 further including
   (a) specifying a database query, said query containing:
      (i) a target time span Indicating a time range over which values of said attribute are required, and
      (ii) a point-of-view time indicating the point in the time from which the values are to be viewed; and
   (b) accessing the database and outputting a sequence of values representing the evolution of said attribute over said target time span, as viewed from said point-of-view time.

7. A data processing method according to claim 6 wherein the step of accessing the database includes retrieving records whose time spans overlap said target time span and whose insertion times are not later than said point-of-view time.

8. A data processing method according to claim 7 further including, for each point in time of the target time span, selecting the attribute from the retrieved record with the latest insertion time whose time span includes said point in time, to provide an output value for that point in time.

* * * * *